(12) United States Patent
Osaki et al.

(10) Patent No.: US 6,987,647 B2
(45) Date of Patent: Jan. 17, 2006

(54) ROTARY HEAD CLEANING DEVICE

(75) Inventors: Hiroyuki Osaki, Miyagi (JP); Shinichiro Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 106 days.

(21) Appl. No.: 10/215,100

(22) Filed: Aug. 8, 2002

(65) Prior Publication Data

US 2003/0043505 A1 Mar. 6, 2003

(30) Foreign Application Priority Data

Aug. 20, 2001 (JP) ........................ 2001-248540

(51) Int. Cl.
*G11B 5/127* (2006.01)

(52) U.S. Cl. ...................................... 360/128
(58) Field of Classification Search .................. 360/128, 360/137, 69, 130.21, 130.33
See application file for complete search history.

(56) References Cited

U.S. PATENT DOCUMENTS

| | | | | |
|---|---|---|---|---|
| 5,453,894 A | * | 9/1995 | Kim et al. ................. | 360/128 |
| 5,473,493 A | * | 12/1995 | Kusui ......................... | 360/128 |
| 6,021,026 A | * | 2/2000 | Dallago ...................... | 360/128 |
| 6,069,776 A | * | 5/2000 | Hasegawa et al. .......... | 360/128 |
| 6,344,947 B1 | * | 2/2002 | Kudo .......................... | 360/128 |
| 6,515,836 B2 | * | 2/2003 | Ozue et al. ................. | 360/313 |
| 6,624,960 B1 | * | 9/2003 | Langiano et al. ............ | 360/69 |

FOREIGN PATENT DOCUMENTS

JP    405094120 A   *   4/1993

* cited by examiner

*Primary Examiner*—Allen Cao
(74) *Attorney, Agent, or Firm*—Robert J. Depke; Holland & Knight LLP

(57) ABSTRACT

A cleaning device capable of cleaning a rotary head without discharging static electricity to a magnetic head is provided. The cleaning device comprises a protruding shaft-like supporting member provided at a position in a housing facing a portion of the outer peripheral surface of a rotary drum and opposite a portion in contact with a magnetic tape, and a cylindrical cleaning member supported at the upper end of the supporting member. The supporting member is configured with a metal material, and is electrically connected with the housing. The cleaning member is made of an electrically conductive resin in which carbon particles are contained. When and while the outer peripheral surface of the cleaning member is in contact with the outer peripheral surface of the rotary drum, the cleaning member is electrically connected with the housing through the supporting member.

14 Claims, 4 Drawing Sheets

ROTARY HEAD CLEANING DEVICE

CROSS REFERENCE TO RELATED APPLICATIONS

The present document claims priority to Japanese Priority Document JP 2001-248540, filed in the Japanese Patent Office on Aug. 20, 2001, the entire contents of which are incorporated herein by reference to the extent permitted by law.

BACKGROUND OF THE INVENTION

1. Field of the Invention

The present invention relates to a cleaning device for a rotary head.

2. Description of the Related Art

FIG. 6 is a schematic drawing showing an example of a conventional cleaning device for a rotary head.

As shown in FIG. 6, a rotary head 10 of a magnetic tape recording and reproducing apparatus has a fixed drum 1002 installed in a housing 20, a rotary drum 1004 installed above the fixed drum 1002, and a magnetic head 1006 attached to the rotary drum 1004.

Two fixed guides 1008, two first guide rollers 1010 and two second guide rollers 1012, which all guide a magnetic tape 1 in its running direction relative to the rotary head 10, are each disposed upstream and downstream with respect to the running direction of the magnetic tape 1 with the rotary head 10 between each of the pairs.

A cleaning device 30 is disposed at a position of the housing 20 facing a portion of the outer peripheral surface of the rotary drum 1004 opposite a portion in contact with the magnetic tape 1. The cleaning device 30 comprises a shaft-like supporting member 3002 provided in the housing 20, and a cylindrical cleaning member 3004 attached to the upper end of the supporting member 3002.

The cleaning member 3004 is made of, for example, urethane or the like, and is installed such that its outer peripheral surface contacts the outer peripheral surface of the rotary drum 1004.

In this structure, the rotary drum 1004 rotates, and the cleaning member 3004 contacts the outer peripheral surface of the rotary drum 1004 and the magnetic head 1006 to clean residual dirt, such as abraded powder debris from magnetic tapes, built-up thereon.

FIG. 7 is a schematic drawing showing another example of a conventional cleaning device for a rotary head.

In the example, a cleaning device 40 comprises a tape-like cleaning member 4002 made of urethane or the like, two rolls 4004 around which both ends of the cleaning member 4002 are wound, and two protruding shaft-like guides 4006 provided in the housing 20.

The cleaning device 40 is structured such that one of the surfaces perpendicular to the thickness of the cleaning member 4002, guided by the two guides 4006, contacts the rotary drum 1004 along the outer peripheral surface of the rotary drum 1004 with a predetermined tension.

In this structure, the rotary drum 1004 rotates, and the surface of the cleaning member 4002 mentioned above contacts the outer peripheral surface of the rotary drum 1004 and the magnetic head 1006 to clean residual dirt, such as abraded powder debris from magnetic tapes, built-up thereon.

However, in the conventional cleaning devices for rotary heads described above, because the cleaning members 3004 and 4002 are made of nonconductive material such as urethane or the like, there is a possibility that the magnetic head 1006 could suffer electrostatic damage caused by static electricity generated through friction between the cleaning members 3004, 4002 and the outer peripheral surface of the rotary drum 1004. In particular, if the magnetic head 1006 comprises a magneto-resistive type head, due to its own properties, there is a problem in that the magnetic head 1006 is prone to electrostatic damage.

SUMMARY OF THE INVENTION

The present invention is proposed in consideration of such problems. It is an aspect of the present invention to provide a cleaning device for a rotary head capable of performing cleaning of a rotary head drum without discharging static electricity to a magnetic head provided with the rotary head.

In order to achieve the aspect above, the present invention is structured such that, in a cleaning device for a rotary head for cleaning the rotary head by bringing a cleaning member into contact with the rotating head inside a housing, the cleaning member is formed of a material having electrical conductivity and the cleaning member is grounded to the housing.

Consequently, according to an embodiment of the present invention, because static electricity generated through contact between the cleaning member and the rotary head flows from the cleaning member to the housing, no static electricity is applied to the magnetic head.

As described above, according to the rotary head cleaning device of the present invention, the cleaning of the rotary head can be performed without having static electricity applied to a magnetic head provided with the rotary head.

BRIEF DESCRIPTION OF THE DRAWINGS

The above and other aspects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Preferred embodiments for the cleaning device of the present invention are described below with reference to the accompanying drawings.

Figure 1:
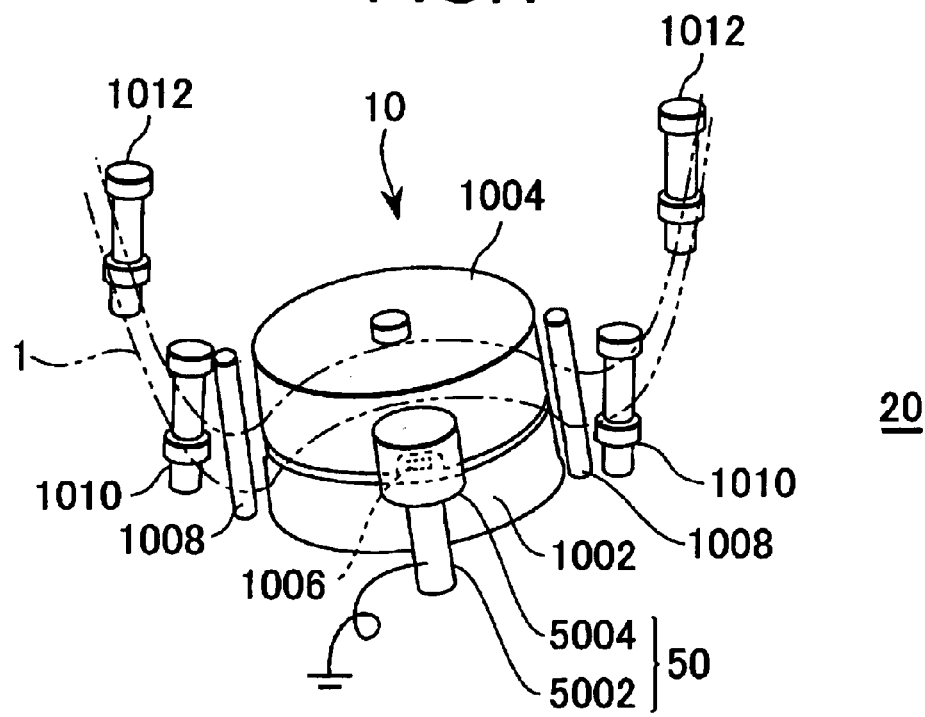
FIG. 1 is a schematic drawing showing a rotary head cleaning device of a first embodiment of the present invention.
Figure 6:
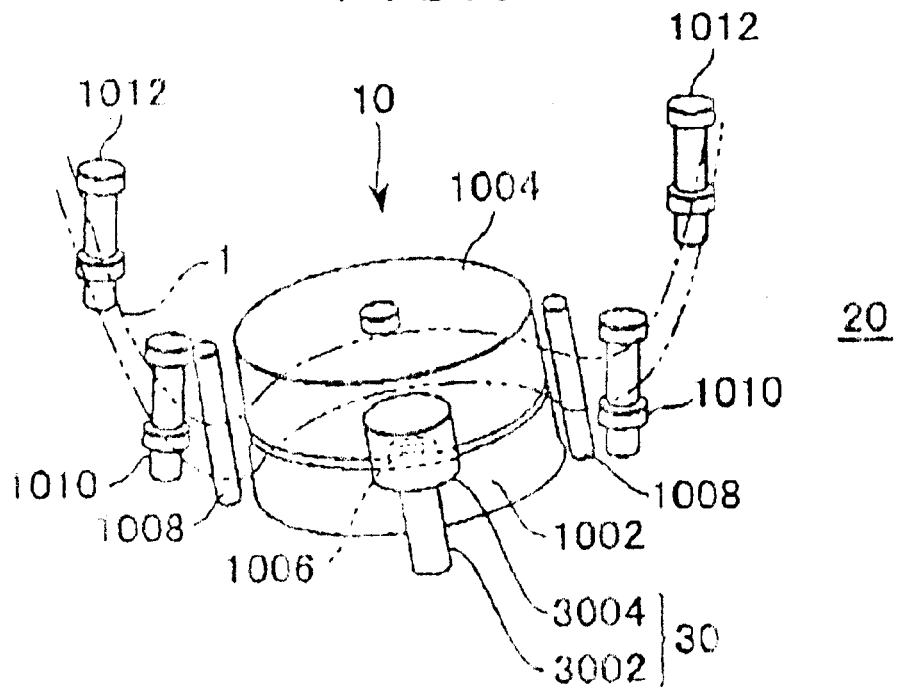
FIG. 6 is a schematic drawing showing an example of a conventional rotary head cleaning device.
Figure 7:
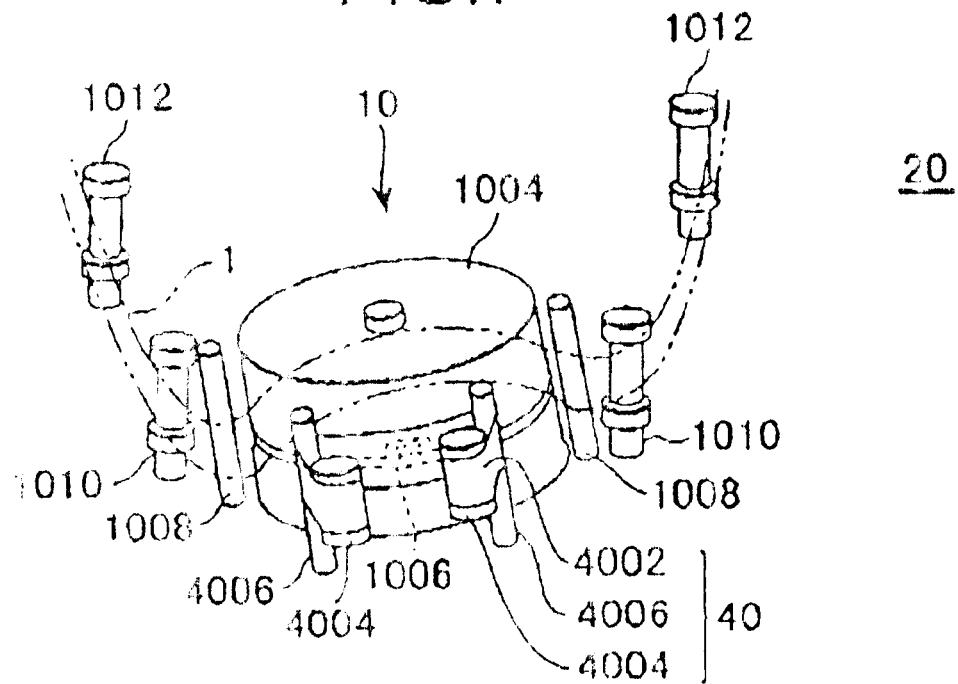
FIG. 7 is a schematic drawing showing another example of a conventional rotary head cleaning device.

FIG. 1 is a schematic drawing showing a cleaning device according to a first embodiment. Like components found in FIGS. 6 and 7 showing conventional examples are designated by identical reference numerals in FIG. 1.

As shown in FIG. 1, a rotary head 10 of a magnetic tape recording and reproducing apparatus comprises a fixed drum 1002 provided in a housing 20, a rotary drum 1004 provided above the fixed drum 1002, and a magnetic head 1006 attached to the rotary drum 1004. A guide, not shown in drawing, for guiding the running of a magnetic tape 1 is provided on the outer peripheral surface of the fixed drum 1002. The housing 20 is made from an electrically conductive material. A cleaning device 50, which will be described later, is disposed close to the rotary head 10.

In the present specification, the housing 20 includes a chassis, a frame and a cover.

Two fixed guides 1008, two first guide rollers 1010 and two second guide rollers 1012, which all guide the magnetic tape 1 in its running direction relative to the rotary head 10, are each disposed upstream and downstream with respect to the running direction of the magnetic tape 1 with the rotary drum 1004 between each of the pairs.

The first guide rollers 1010 are each structured to include a roller section driven by the running of the magnetic tape 1 to rotate and a non-rotating flange provided on an upper portion of the roller section and which regulates the upper edge of the magnetic tape 1.

The second guide rollers 1012 are each structured to include a roller section which rotates along with the running magnetic tape 1 and a non-rotating flange provided on a lower portion of the roller section for regulating the lower edge of the magnetic tape 1.

By having the upper edge of the magnetic tape 1 regulated by the flanges of the first guide rollers 1010 and having the lower edge of the magnetic tape 1 regulated by the flanges of the second guide rollers 1012, the lower edge of the magnetic tape 1 runs along the guide of the fixed drum 1002. Thus, the magnetic head 1006 traces the right tracks on the magnetic tape 1.

The magnetic head 1006 comprises a magneto-resistive type head.

The magneto-resistive type head includes a magneto-resistive (MR) head, a giant magneto-resistive (GMR) head, a tunneling magneto-resistive (TMR) head, and the like.

The MR head utilizes the principle that, when an electric current flows through an element made of a material, such as Permalloy, showing a magneto-resistive effect (MR effect), the electrical resistance of the element changes according to the angle formed between the direction in which the electric current flows and the direction of an external magnetic field. That is, the MR head is structured to perceive changes in an external magnetic field by measuring changes in electrical resistance.

The GMR head, like the MR head, utilizes the magneto-resistive effect, but its element is configured in a film structure in which a ferromagnetic layer, a non-magnetic layer and a ferromagnetic layer are layered on one another and an anti-ferromagnetic layer is formed adjacent thereto.

The TMR head is a magneto-resistive type head which makes use of tunnel conduction.

The cleaning device 50 comprises a protruding shaft-like supporting member 5002 provided at a position in the housing 20 facing a portion of the outer peripheral surface of the rotary drum 1004, and opposite a portion of the outer peripheral surface with which the magnetic tape 1 is in contact, and a cylindrical cleaning member 5004 supported at the upper end of the supporting member 5002.

The supporting member 5002 is made of a metal material, and is electrically connected with the housing 20. The cleaning member 5004 is made of an electrically conductive resin containing carbon particles such that its electrical resistance is $10^{10}$ Ω or less.

The cleaning member 5004 is provided with a bearing (not shown) into which ball bearings are incorporated. The cleaning member 5004 is supported by the supporting member 5002 to be rotatable via the bearing. Both the ball bearing and the bearing are made of a conductive material, and there is conductive grease between the ball bearing and the bearing.

Thus, the cleaning member 5004 is structured to be driven to rotate by the rotations of the rotary drum 1004 in a condition where the cleaning member is located at a cleaning position at which the outer peripheral surface thereof contacts the outer peripheral surface of the rotary drum 1004. Further, the cleaning member 5004 is electrically connected with the housing 20 via the bearing, the conductive grease, the ball bearing and the supporting member 5002.

According to the configuration described above, residual dirt, such as abraded powder debris from magnetic tapes, on the outer peripheral surface of the rotary drum 1004 and on the magnetic head 1006 is cleaned as the cleaning member 5004 contacts the outer peripheral surface of the rotary drum 1004 and the magnetic head 1006 while the rotary drum 1004 rotates.

Static electricity generated due to contact between the cleaning member 5004 and the outer peripheral surface of the rotary drum 1004 and the magnetic head 1006 flows to the housing 20 via the cleaning member 5004, the bearing, the conductive grease, the ball bearing and the supporting member 5002.

Consequently, no static electricity is applied to the magnetic head 1006, and electrostatic damage can thereby be prevented.

Figure 2:
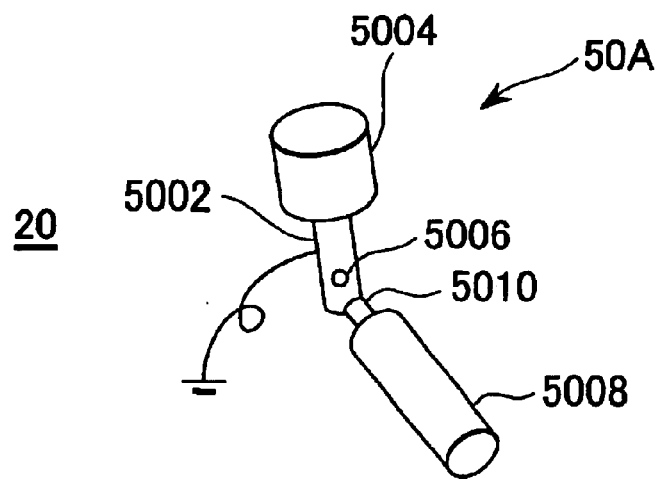
FIG. 2 is a schematic drawing showing a variation of the rotary head cleaning device of the first embodiment of the present invention.

FIG. 2 is a schematic drawing showing a variation of the cleaning device of the first embodiment.

In a cleaning device 50A, the supporting member 5002 is supported at a fulcrum 5006 so as to be swingable towards the housing 20, and the plunger 5010 of a solenoid 5008 is connected with the supporting member 5002.

Further, the cleaning device 50A is configured such that the supporting member 5002 is caused to swing by an on/off operation of the solenoid 5008. Accordingly, the cleaning member 5004 is disposed so as to be movable between a cleaning position where the cleaning member 5004 contacts the rotary head 10 and a non-cleaning position away from the rotary head 10.

In this variation too, as in the first embodiment above, static electricity generated due to contact between the cleaning member 5004 and the outer peripheral surface of the rotary drum 1004 and the magnetic head 1006 flows to the housing 20 via the cleaning member 5004, the bearing, the nonconductive grease, the ball bearing and the supporting member 5002. Consequently, static electricity is not applied to the magnetic head 1006, and electrostatic damage can be prevented.

Figure 3:
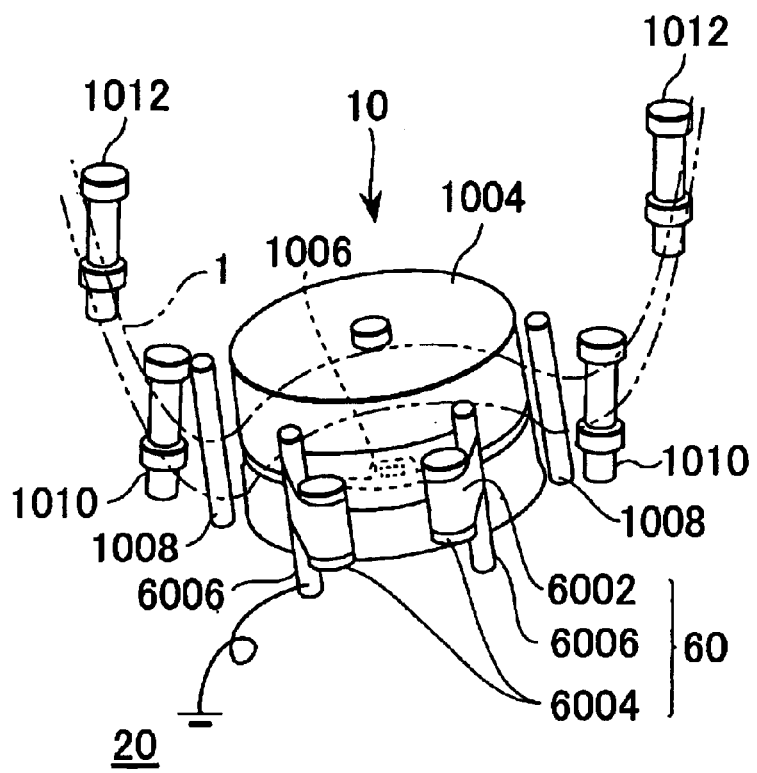
FIG. 3 is a schematic drawing showing a rotary head cleaning device of a second embodiment of the present invention.

FIG. 3 is a schematic drawing showing a cleaning device according to a second embodiment. Like components found in FIGS. 6 and 7 are designated by the same reference numbers in FIG. 3.

A cleaning device 60 is made of a tape-like cleaning member 6002, two rolls 6004 to which both ends of the cleaning member 6002 are wound and which are provided so as to be rotatble relative to a housing 20, and two protruding shaft-like guides 6006 provided at a position in the housing 20 close to a rotary head 10.

The cleaning member 6002 is made of a synthetic resin as its base, and polishing surfaces are formed on both surfaces of the cleaning member 6002 which are perpendicular to the thickness thereof. Carbon particles are included in the material of the polishing surfaces, and consequently the polishing surfaces, that is, the cleaning member 6002, are configured to have an electrical resistance of $10^{10}$ Ω or less. In other words, the cleaning member 6002 is formed to have electrical conductivity.

Each of the rolls 6004 is made of a metal material, and is rotatably supported by a bearing (not shown) provided in the housing 20 and into which a ball bearing is incorporated. Moreover, each of the rolls 6004 is configured to wind the cleaning member 6002 from one roll 6004 to the other roll 6004 by being rotated by rotating and driving means (not shown). And the rolls 6004 are configured such that they provide tension to the cleaning member 6002 between the rolls 6004 by way of the driving force of the rotating and driving means.

Both the ball bearing and the bearing are made of a material having electrical conductivity, and there is conductive grease between the ball bearing and the bearing.

The guides 6006 are made of a metal material, and are electrically connected with the housing 20.

The cleaning device 60 is structured such that the cleaning member 6002 is guided by the two guides 6006 in order that the polishing surface of the cleaning member 6002 contacts the rotary drum 1004 along the outer peripheral surface of the rotary drum 1004. Moreover, the pressing force of the cleaning member 6002 at the time of contact with the rotary drum 1004 is adjusted by the tension provided to the cleaning member 6002 between the rolls 6004 by the rotating and driving means.

Consequently, in a condition where the cleaning member 6002 is at the cleaning position in which its polishing surface contacts the outer peripheral surface of the rotary drum 1004, the cleaning member 6002 is electrically connected with the housing 20 via the rolls 6004, the bearing, the ball bearing and the conductive grease, and is also electrically connected with the housing 20 via the guides 6006.

In the present embodiment, the rolls 6004 and the guides 6006 constitute the supporting member claimed in the appended claims.

In the configuration described above, the rotary drum 1004 rotates, and the polishing surface of the cleaning member 6002 thereby contacts the outer peripheral surface of the rotary drum 1004 and the magnetic head 1006, and cleans residual dirt, such as abraded powder debris from magnetic tapes, built-up thereon.

Static electricity generated due to contact between the cleaning member 6002 and the outer peripheral surface of the rotary drum 1004 and the magnetic head 1006 flows to the housing 20 via the cleaning member 6002, the rolls 6004, the bearing, the conductive grease and the ball bearing, and the static electricity also flows to the housing 20 via the guides 6006 which function as supporting members.

Consequently, no static electricity is applied to the magnetic head 1006, and electrostatic damage can thus be prevented.

Figure 4:
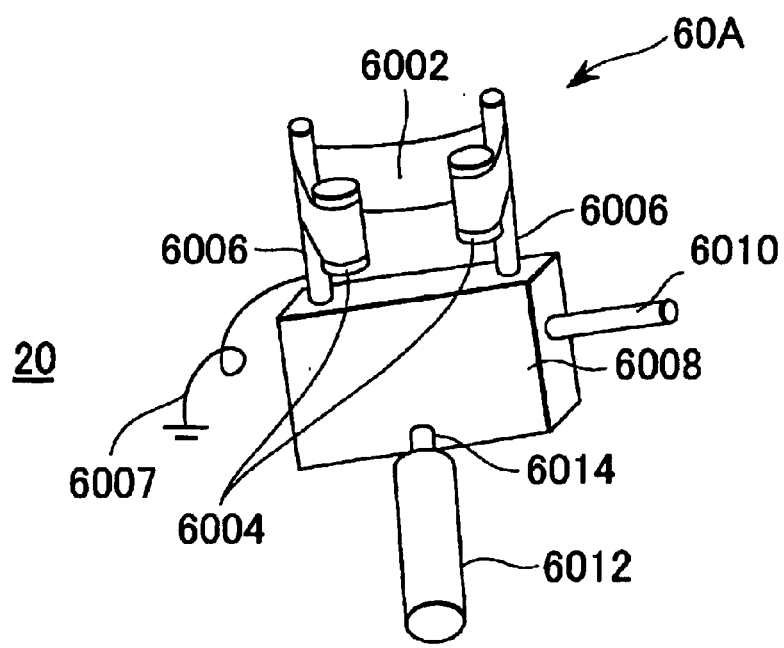
FIG. 4 is a schematic drawing showing a variation of the rotary head cleaning device of the second embodiment of the present invention.

FIG. 4 is a schematic drawing showing a variation of the cleaning device of the second embodiment.

In a cleaning device 60A, the rolls 6004 and the guides 6006 are provided on a swing member 6008. The swing member 6008 is swingably supported on the housing 20 by a supporting shaft 6010. A plunger 6014 of a solenoid 6012 is connected with the swing member 6008.

The guides 6006 are connected with the housing 20 with a lead wire 6007.

The swing member 6008 is configured such that it is caused to swing by an on/off operation of the solenoid 6012. Thus, the cleaning member 6002 is disposed to be able to move between a cleaning position at which the cleaning member 6002 contacts the rotary drum 1004 and a non-cleaning position away from the rotary drum 1004.

In this variation too, as in the second embodiment, static electricity generated due to contact between the cleaning member 6002 and the outer peripheral surface of the rotary drum 1004 and the magnetic head 1006 flows to the housing 20 via the guides 6006 and the lead wire 6007.

Consequently, no static electricity is applied to the magnetic head 1006, and electrostatic damage can be prevented.

The applicant of the present invention confirmed through experiments if there is any difference in the preventive effect against electrostatic damage to the magnetic head depending on whether grounding of the cleaning member to the housing is present or not.

Figure 5A:
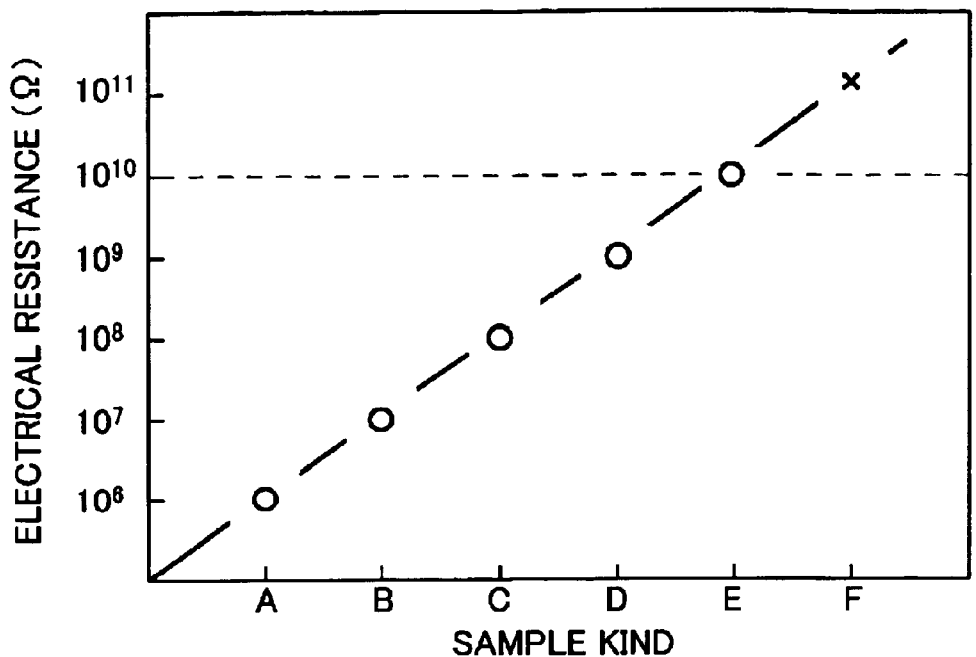
FIG. 5A is an explanatory diagram showing measurement results of the preventive effect against electrostatic damage to a magnetic head when cleaning operations are performed on a rotary head in a condition where, in the first embodiment, a cleaning member is grounded to a housing.

FIG. 5A is an explanatory diagram showing measurement results of the preventive effect against electrostatic damage to the magnetic head 1006 when cleaning operations of the rotary drum 1004 are performed in a state in which the cleaning member 5004 is grounded to the housing 20 in the first embodiment.

Figure 5B:
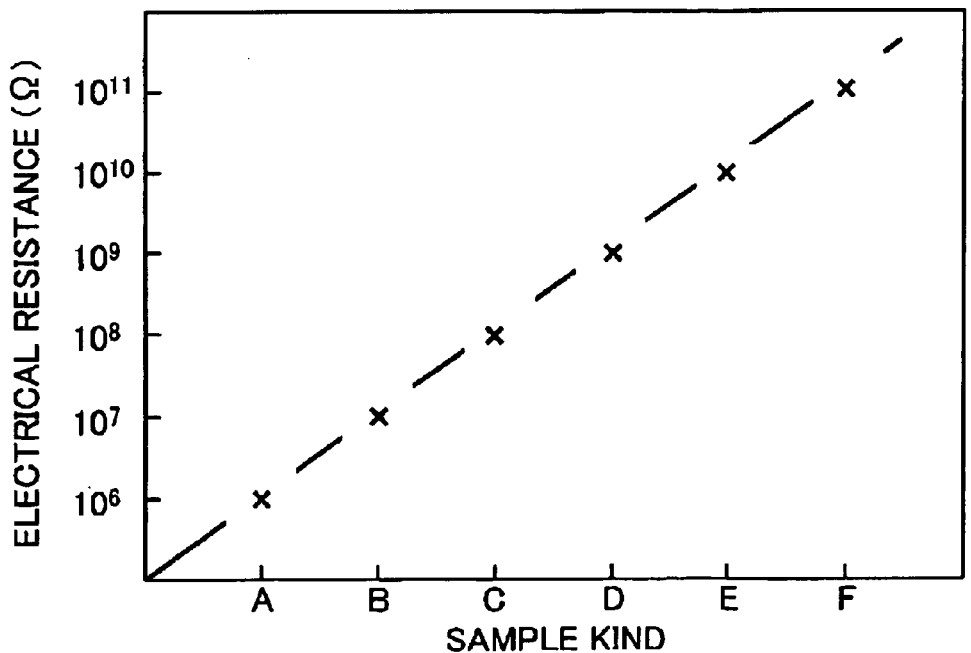
FIG. 5B is an explanatory diagram showing measurement results of the preventive effect against electrostatic damage to the magnetic head when cleaning operations are performed on the rotary head in a condition where, in the first embodiment, the cleaning member is not grounded to the housing.

FIG. 5B is an explanatory diagram showing measurement results of the preventive effect against electrostatic damage to the magnetic head 1006 when cleaning operations of the rotary drum 1004 are performed in a state in which the cleaning member 5004 is not grounded to the housing 20 in the first embodiment.

On the horizontal axes in FIGS. 5A and 5B, characters indicating different sample kinds of the cleaning member 5004 are shown, and the vertical axes in FIGS. 5A and 5B represent electrical resistance of the cleaning member 5004. Moreover, a circle in these figures indicates that the magnetic head 1006 did not suffer electrostatic damage, and a cross in these figures indicates that the magnetic head 1006 suffered electrostatic damage.

Samples A to F are made by including, in urethane, carbon particles each having a diameter of about 20 nm at predetermined weight percentages, and the weight percentage of the carbon particles of each sample is as follows.

Sample A: 30%
Sample B: 25%
Sample C: 20%
Sample D: 15%
Sample E: 10%
Sample F: 5%

As shown in FIG. 5A, it can be seen that if the electrical resistance of the cleaning member 5004 is $10^{10}$ Ω or less, electrostatic damage to the magnetic head 1006 can be prevented.

As shown in FIG. 5B, it can be seen that if the cleaning member 5004 is not grounded to the housing 20, electrostatic damage to the magnetic head 1006 cannot be prevented even if the electrical resistance of the cleaning member 5004 is $10^6$ Ω or less.

From the experiment results, it was found that making the electrical resistance of the cleaning member be $10^{10}$ Ω or less and, at the same time, grounding the cleaning member to the housing are effective in preventing electrostatic damage to a magnetic head.

In the first embodiment, the cleaning member 5004 is made of electrically conductive resin containing carbon particles, and in the second embodiment, the cleaning member 6002 is made by including carbon particles in a material of the polishing surfaces formed on both surfaces of a base comprising synthetic resin. However, the present invention is not limited thereto, and the cleaning member may be made from an arbitrary material as long as it has the aforesaid electrical conductivity. For example, the following materials may be used: an electrically conductive resin made of a polymeric material in which an electrically conductive material is contained, a semiconductor material, a polymeric material showing metallic or semiconductor-like electrical conductivity, and the like.

Moreover, although in the first and the second embodiments, the cleaning member is supported by the supporting member made of a metal material, and the grounding of the cleaning member to the housing is performed via the supporting member, it is sufficient that the material of the supporting member be a material having electrical conductivity.

Moreover, the cleaning member simply needs to be grounded to the housing. Therefore a configuration in which the cleaning member is grounded to the housing through some other member having electrical conductivity (such as a lead wire) other than the supporting member may be employed. Nonetheless, by grounding the cleaning member to the housing via the supporting member, the number of parts can be decreased, and it is thus advantageous in decreasing costs.

Moreover, it is arbitrary whether to dispose the cleaning member at a fixed cleaning position where the cleaning member contacts the rotary head, or to dispose the cleaning member so as to be movable between a cleaning position and a non-cleaning position away from the rotary head.

However, the number of parts can be decreased by disposing the cleaning member at a fixed cleaning position where the cleaning member contacts the rotary head, and it is thus advantageous in decreasing costs.

Moreover, the timing and the duration of performing cleaning on the rotary head can be set arbitrarily in a case where the cleaning member is disposed so as to be movable between a cleaning position and a non-cleaning position at which the cleaning member is separated from the rotary head. Thus, the case has an advantage in that it is capable of executing cleaning at and over an optimal timing and duration for an apparatus (a magnetic tape recording and reproducing apparatus) equipped with the cleaning device.

Moreover, in the first embodiment, the cylindrical cleaning member 5004 is rotatably provided, but the cleaning member 5004 may also be provided such that it does not rotate.

The shape of the cleaning member is not limited to a cylindrical or tape shape, and may be arbitrarily chosen.

It is sufficient that the housing 20 comprise at least a portion having electrical conductivity, and the cleaning member may be grounded to the housing 20 at this portion of the housing 20 having electrical conductivity.

Although the invention has been described in its preferred form with a certain degree of particularity, obviously many changes and variations are possible therein. It is therefore to be understood that the present invention may be practiced otherwise than as specifically described herein without departing from the scope and sprit thereof.

What is claimed is:

1. A rotary head cleaning device for cleaning a rotary head, comprising:

a cleaning member made of a material having electrical conductivity;

said cleaning member contacts said rotary head and said material having electrical conductivity has an electrical resistance of $10^{10}$ Ω or less; and further wherein said cleaning member is grounded and contacts said rotary head with an outer peripheral surface of said cleaning member.

2. The rotary head cleaning device according to claim 1, wherein:

said rotary head comprises a rotary drum, and a magnetic head attached to said rotary drum; and said magnetic head is a magneto-resistive type head.

3. The rotary head cleaning device according to claim 2, wherein said magneto-resistive type head is one of a magneto-resistive head, a giant magneto-resistive head and a tunneling magneto-resistive head.

4. The rotary head cleaning device according to claim 1, wherein said material having electrical conductivity comprises an electrically conductive resin made of a polymeric material containing an electrically conductive material.

5. The rotary head cleaning device according to claim 1, wherein said material having electrical conductivity comprises a semiconductor material.

6. The rotary head cleaning device according to claim 1, wherein said material having electrical conductivity comprises a polymeric material having metallic or semiconductor-like electrical conductivity.

7. The rotary head cleaning device according to claim 1, wherein:

said cleaning member is formed in a tape-like shape; and said cleaning member contacts said rotary head with a surface of said cleaning member perpendicular to the thickness direction of said cleaning member.

8. The rotary head cleaning device according to claim 1, wherein:

said cleaning member is supported by a supporting member having electrical conductivity; and said cleaning member is grounded to said housing via said supporting member.

9. The rotary head cleaning device according to claim 1, wherein said cleaning member is disposed so as to be movable between a cleaning position where said cleaning member contacts said rotary head and a non-cleaning position away from said rotary head.

10. The rotary head cleaning device according to claim 1, wherein said rotary head is a rotary head for a magnetic tape recording and reproducing apparatus.

11. The rotary head cleaning device according to claim 1, wherein:

said housing comprises a portion having electrical conductivity; and said cleaning member is grounded to an electrically conductive portion of said housing.

12. A rotary head cleaning device for cleaning a rotary head, comprising:

a cleaning member made of a material having electrical conductivity;

said cleaning member contacts said rotary head; and said material having electrical conductivity has an electrical resistance of $10^{10}$ Ω or less; and further wherein said cleaning member contacts said rotary bead with a surface of said cleaning member perpendicular to the thickness direction of said cleaning member;

the cleaning member is supported by a supporting member having electrical conductivity;

the cleaning member is grounded to said housing via said supporting member; and said cleaning member is disposed so as to be movable between a cleaning position where said cleaning member contacts said rotary head and a non-cleaning position away from said rotary head.

13. The rotary head cleaning device according to claim 12, wherein said rotary head is a rotary head for a magnetic tape recording and reproducing apparatus.

14. The rotary head cleaning device according to claim 12, wherein:

said housing comprises a portion having electrical conductivity; and said cleaning member is grounded to an electrically conductive portion of said housing.

* * * * *